United States Patent
Maury et al.

(10) Patent No.: US 8,708,429 B2
(45) Date of Patent: Apr. 29, 2014

(54) HYDRAULIC BRAKING ASSEMBLY FOR A VEHICLE COMPRISING A HYDRAULIC FLUID LEVEL SENSOR

(75) Inventors: Vincent Maury, Asnieres sur Seine (FR); Jean-Michel L'Aot, Stains (FR); Antony Auguste, Villiers sur Marne (FR); Philippe Richard, Chelles (FR); François Gaffe, Bondy (FR); Bastien Cagnac, Cramoisy (FR)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 13/086,637

(22) Filed: Apr. 14, 2011

(65) Prior Publication Data

US 2011/0254362 A1   Oct. 20, 2011

(30) Foreign Application Priority Data

Apr. 14, 2010 (FR) ...................... 10 01590

(51) Int. Cl.
*B60T 13/74* (2006.01)
(52) U.S. Cl.
USPC ............................................ 303/20
(58) Field of Classification Search
CPC ............................. B60T 11/26; B60T 17/225
USPC ............................ 303/20, 3; 60/585
See application file for complete search history.

(56) References Cited

U.S. PATENT DOCUMENTS

| | | | | |
|---|---|---|---|---|
| 2,825,895 | A | * | 3/1958 | Malagarie .................. 340/450.1 |
| 3,792,433 | A | * | 2/1974 | Wada ............................ 340/452 |
| 2006/0283244 | A1 | | 12/2006 | Schonlau et al. |
| 2010/0071361 | A1 | | 3/2010 | Tandler et al. |

FOREIGN PATENT DOCUMENTS

| | | | | |
|---|---|---|---|---|
| DE | 19627082 A1 | * | 1/1998 | ............ G01F 23/60 |
| DE | 102007025826 A1 | * | 6/2008 | ............ B60T 17/22 |
| FR | 2860474 A1 | | 4/2005 | |
| JP | 04108057 A | * | 4/1992 | ............ B60T 13/14 |
| JP | 2008207664 A | * | 9/2008 | ............ B60T 17/18 |
| WO | 01/38152 A1 | | 5/2001 | |
| WO | 2010/006996 A1 | | 1/2010 | |

OTHER PUBLICATIONS

FR1001590 International Search Report and Written Opinion.

\* cited by examiner

*Primary Examiner* — Xuan Lan Nguyen
(74) *Attorney, Agent, or Firm* — Michael Best & Friedrich LLP

(57) ABSTRACT

A hydraulic braking assembly (14) for a vehicle comprising an electric servomotor (15), a master cylinder (16), a hydraulic fluid tank (17) mounted on the master cylinder, a hydraulic fluid level sensor (25) situated inside the fluid tank and monitoring the hydraulic fluid level inside the tank. The fluid level sensor is connected from the tank to the computer of the electric servomotor by a cable (26).

11 Claims, 1 Drawing Sheet

HYDRAULIC BRAKING ASSEMBLY FOR A VEHICLE COMPRISING A HYDRAULIC FLUID LEVEL SENSOR

BACKGROUND OF THE INVENTION

The invention relates to a hydraulic braking assembly of a vehicle comprising a hydraulic fluid tank, said tank being equipped with a hydraulic fluid level sensor. The aim of the invention is to simplify the fitting of a hydraulic braking assembly. Another aim of the invention is to reduce the manufacturing cost of this hydraulic assembly.

The invention can be applied to the motor vehicle field but could be applied to other fields.

FIG. 1 diagrammatically illustrates a hydraulic braking assembly 1 of the state of the art. This hydraulic braking assembly 1 is formed by an electric servomotor 2 supporting braking (brake booster), a hydraulic master cylinder 3, a hydraulic fluid tank 4 and at least one hydraulic braking circuit (not represented). The servomotor 2 comprises an electric motor 5, a computer 6 and a battery 7. The computer 6 forms an electronic control device and is connected to the battery 7. A brake pedal (not represented) is connected to a control rod 8, which is in turn mechanically connected to the servomotor 2. The computer 6 is also connected to a central control member (not represented) by a first cable 9. The central control member collects all the electronic vehicle data. The central control member may include a dashboard to which the first cable 9 is connected by means of a CAN (Controller Area Network) type bus.

The tank 4 is mounted on the master cylinder 3 to feed at least one chamber (not represented) of the master cylinder 3 with fluid. The hydraulic braking circuit connects the chamber of the master cylinder 3 to a braking device (not represented) mounted on a wheel of a vehicle.

The electric servomotor 2 comprises a screw/nut assembly 10 converting a rotational movement of the rotor-forming nut of the electric motor 5 into a rotational movement of the screw which displaces a support piston 11 toward the master cylinder 3. The servomotor 2 is actuated by the control rod 8 displaced by the brake pedal. A force sensor (not represented) measures the force applied to the control rod 8 by the driver via the brake pedal. The information concerning the force applied to the control rod 8 is transmitted to the computer 6. This computer 6 then generates, on the basis of this information, a control command to the electric motor 5 so as to displace the support piston 11 according to the force exerted on the control rod 8.

The fluid tank 4 contains an amount of hydraulic fluid that makes it possible to permanently feed the chamber of the master cylinder 3.

A hydraulic fluid level sensor 12 is placed inside this tank 4. This sensor 12 is, in one example, of the REED glass envelope type or of the HALL effect type (or proximity magnetic sensor). In the case of a REED glass envelope sensor, it is formed by two electromagnetic blades and by an electromagnet. The two blades are in contact with one another as long as the electromagnet is placed above the blades, that is to say that the fluid level is above the blades. When the electromagnetic approaches the blades, they end up separating because of the proximity of the electromagnet tending to separate the blades from one another. The electrical contact is then broken and this information is transmitted to the driver via a light and/or audible signal communicated by a dashboard.

The sensor 12 is electrically connected to the central control member by a second cable 13. The central control member may also include a central computer to which the second cable 13 is linked.

A first cable 9 and a second cable 13 are therefore necessary to connect the hydraulic braking assembly 1 to the central control member. The problem is that the second cable 13 is bulky, possibly measuring up to 50 cm to reach the central control member. This second cable 13 may be inadvertently caught when the bonnet of the vehicle has to be opened to check the condition of at least one member of the vehicle or to repair at least one member. This second cable 13 may then be cut or at least hinder the operator. To avoid the possible hindrance of this second cable 13, it can be arranged in a controlled manner inside the space enclosed by the bonnet of the vehicle. To do this, this second cable 13 may be pressed against a wall of the cowl while being clipped, or else glued or clipped against another wall of a member of the vehicle. However, the surface of certain areas of the cowl (those exposed to external climatic variations), or the surface of a given member, may be subject to temperature variations that may damage the quality of this second cable 13. Notably, the heat or cold may impede correct operation and/or cause premature wear of this second cable 13. It is therefore important to be careful to choose the correct places, that is to say those which present least risk of damaging the quality of this second cable 13.

Fitting such a second cable is therefore difficult, tedious and costly.

SUMMARY OF THE INVENTION

The object of the invention is therefore to remedy this problem.

More particularly, according to the invention, the level sensor is no longer directly connected to the central control member but to the computer of the servomotor. In this way, it is no longer necessary to provide the second cable. Only a third cable which directly connects the sensor to the computer of the servomotor is provided according to the invention. The length of this third cable is greatly reduced compared to that of the second cable since the computer of the servomotor is situated in proximity to the hydraulic tank.

Thus, the hydraulic assembly therefore forms a single-piece assembly which can be connected by a single cable to the central control member.

The invention also enables the manufacturer of the vehicle to be master of the technology associated with the level sensor and with the computer of the servomotor. The manufacturer can originate the design of the software used to receive and manage the information transmitted by the sensor. The manufacturer will be able to be free to choose what type of sensor he wants to fit according to the type of applications provided by such a type of sensor, the cost and the type of vehicle. The manufacturer will no longer be dependent on the central computer of the central control member in choosing the sensor.

The invention enables the vehicle manufacturer to have a choice as to the placement of the sensor in the tank and above all to have a choice as to the type of sensor to be installed.

The subject of the invention is therefore a hydraulic braking assembly for a vehicle comprising an electric servomotor comprising an electric motor and a computer, the computer being connected to a central control member by a first cable and being used to actuate the electric motor when a brake pedal is actuated by a driver, a master cylinder connected to the servomotor by a support piston actuated by the motor of the servomotor, a hydraulic fluid tank mounted on the master cylinder, said tank communicating with a chamber of the master cylinder to feed the master cylinder with hydraulic fluid, a hydraulic fluid level sensor situated in a wall of the fluid tank to monitor the hydraulic fluid level inside the tank, characterized in that the fluid level sensor is connected from the tank to the computer of the electric servomotor by a connection means.

BRIEF DESCRIPTION OF THE DRAWINGS

The invention will be better understood from reading the following description and examining the accompanying figure. The latter is presented purely as an indication and is in no way limiting on the invention.

DETAILED DESCRIPTION

Figure 1:
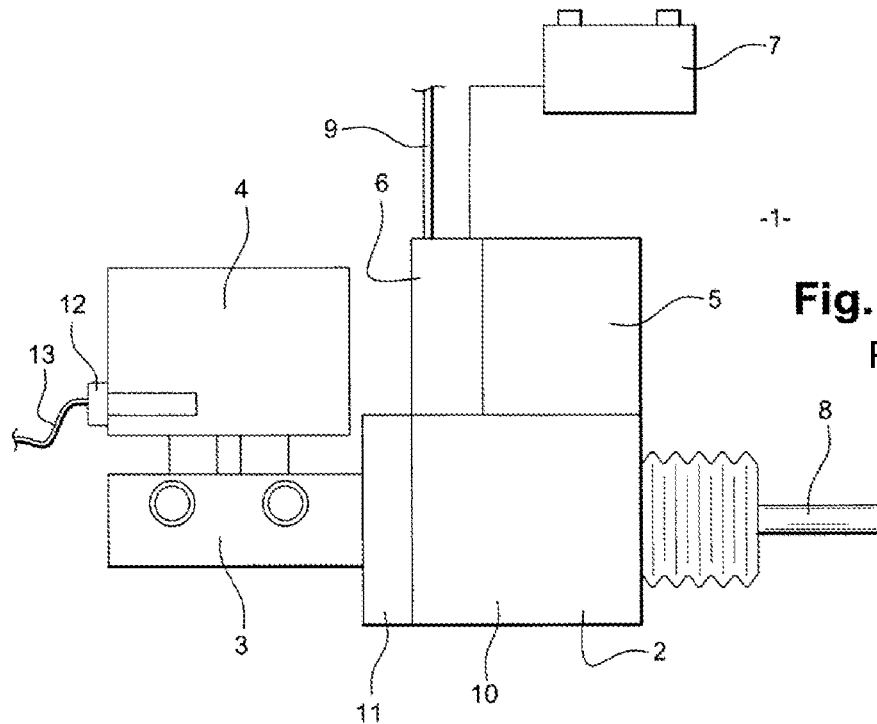
FIG. 1 is a schematic representation of a prior art hydraulic braking assembly.
Figure 2:
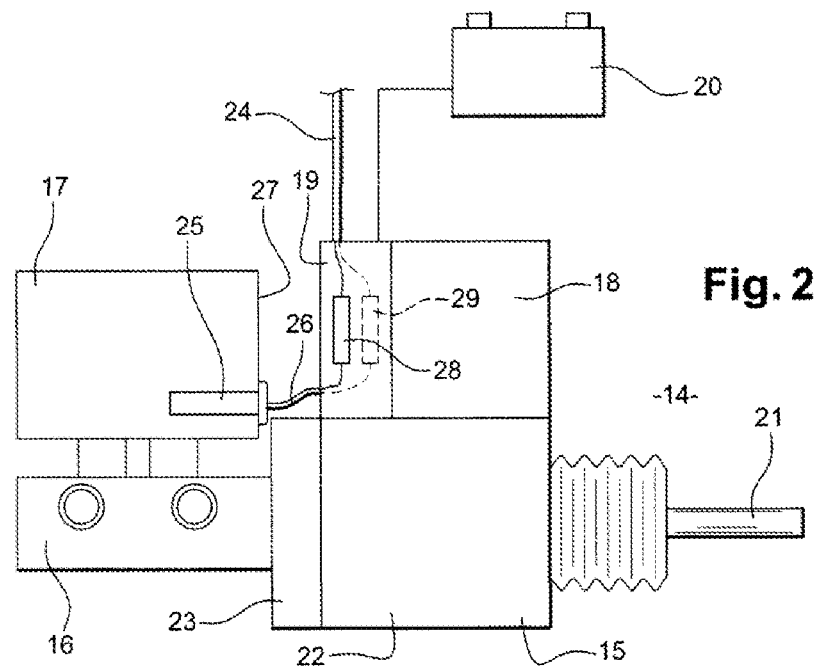
FIG. 2 is a schematic representation of a hydraulic braking assembly comprising a fluid level sensor, according to the invention.

FIG. 2 illustrates another hydraulic braking assembly 14 of a vehicle, according to the invention. As for the hydraulic assembly 1 described in FIG. 1, this other hydraulic assembly 14 comprises an electric servomotor 15 supporting braking (brake booster), a master cylinder 16, a hydraulic fluid tank 17 and at least one hydraulic braking circuit (not represented). The servomotor 15 comprises an electric motor 18 and a computer 19. The computer 19 forms an electronic control device and is connected to a battery 20. The computer 19 is also connected to a central control member (not represented). The central control member comprises a dashboard. The computer 19 can be connected to the dashboard by a CAN-type bus. The computer 19 is more particularly connected to the central control member via the bus by a first cable A brake pedal (not represented) is connected to a control rod 21, which is in turn mechanically connected to the servomotor 15.

The tank 17 is mounted on the master cylinder 16 to feed at least one chamber (not represented) of the master cylinder 16 with fluid. The hydraulic braking assembly connects the chamber of the master cylinder 16 to a braking device (not represented) mounted on a wheel of a vehicle. The braking device may be a disk brake or even a drum brake.

The electric servomotor 15 comprises a screw/nut assembly 22 converting a rotational movement of the rotor-forming nut of the electric motor 18 into a rotational movement of the screw that displaces a support piston 23 toward the master cylinder. The servomotor 15 is actuated by the control rod 21 displaced by the brake pedal. As for the hydraulic assembly 1 described in FIG. 1, a force sensor (not represented) measures the force applied to the control rod 21 by the driver via the brake pedal.

The fluid tank 17 contains a quantity of fluid for feeding the chamber of the master cylinder 16. The tank 17 feeds the master cylinder with fluid so that the pressure exerted by the support piston 23 on this fluid can allow a sufficient convergence of the brake pads relative to the disk or relative to the drum plate in order to bring about a braking of the vehicle.

A hydraulic fluid level sensor 25 is placed inside this tank 17. As mentioned previously, this sensor 25 may be of the REED glass envelope type, or else of the HALL effect type, or any other type of sensor suitable for this type of application.

The level sensor 25 is placed through the wall of the tank 17 in a leak-tight manner so that it communicates with the fluid inside the tank 17.

According to the invention, the level sensor 25 is connected to the computer 19 of the hydraulic assembly 14 by a second cable 26 or any other connection means 26, rigid or otherwise.

The level sensor 25 is situated in proximity to the computer 19, that is to say that its placement through the wall of the tank 17 is optimized so that the length of the second cable 26 which connects the level sensor 25 to the computer 19 is as short as possible. In one example, the length of this second cable 26 is between 2 and 6 cm, preferably 3 cm.

More specifically, the tank 17 has a face 27 which faces toward the computer 19. The sensor 19 is housed in a wall of the tank 17 so that the second cable 26 leaves from this face 27.

When the fluid level reaches a level which is detected by the level sensor 25, a signal is produced which is sent from the sensor 25 to the computer 19 via the second cable 26.

The computer 19 has first types of circuits 28 for transmitting the signal from the sensor 25 to the central control member. It is the central control member which then processes the information.

The computer 19 may also have second types of circuits 29 for receiving and processing the signal from the sensor 25, these same second types of circuits then transmitting the processed signals to the central control member.

The signal transmitted by the sensor 25 may then be communicated to the driver via a sound and/or light indicator on the dashboard.

The invention claimed is:

1. A hydraulic braking assembly (14) comprising an electric servomotor (15) including an electric motor (22) and a computer (19), the computer being connected to a central control member by a first cable (24) and being used to actuate the electric motor when a brake pedal is actuated by a driver, a master cylinder (16) connected to the servomotor by a support piston (23) actuated by the motor of the servomotor, a hydraulic fluid tank (17) mounted on the master cylinder, said tank communicating with a chamber of the master cylinder to feed the master cylinder with hydraulic fluid, a hydraulic fluid level sensor (25) situated in a wall of the fluid tank to monitor the hydraulic fluid level inside the tank, characterized in that the fluid level sensor is connected from the tank to the computer of the electric servomotor by an electrical connector connected directly to the computer (19).

2. A hydraulic braking assembly according to claim 1, characterized in that the computer of the servomotor has circuits for transmitting the signal from the sensor to the central control member.

3. A hydraulic braking assembly according to claim 1, characterized in that the computer of the servomotor has circuits for processing the signal from the sensor and transmitting processed signals to the central control member.

4. A hydraulic braking assembly according to claim 1, characterized in that the tank has a face that faces toward the computer, and the electrical connector leaves from this face.

5. A hydraulic braking assembly according to claim 1, wherein the computer of the servomotor has circuits both for transmitting the signal from the sensor to the central control member and for processing the signal from the sensor and transmitting processed signals to the central control member.

6. A hydraulic braking assembly according to claim 1, characterized in that the sensor is located proximal to the computer, such that a length of the electrical connector is as short as possible.

7. A hydraulic braking assembly (14) comprising an electric servomotor (15) including an electric motor (22) and a computer (19), the computer being connected to a central control member by a first cable (24) and being used to actuate the electric motor when a brake pedal is actuated by a driver, a master cylinder (16) connected to the servomotor by a support piston (23) actuated by the motor of the servomotor, a hydraulic fluid tank (17) mounted on the master cylinder, said tank communicating with a chamber of the master cylinder to feed the master cylinder with hydraulic fluid, a hydraulic fluid level sensor (25) situated in a wall of the fluid tank to monitor the hydraulic fluid level inside the tank, characterized in that the fluid level sensor is connected from the tank to the computer of the electric servomotor by a connection means (26), and wherein the computer of the servomotor has circuits for transmitting the signal from the sensor to the central control member.

8. A hydraulic braking assembly according to claim 7, wherein the computer of the servomotor has circuits for processing the signal from the sensor and transmitting processed signals to the central control member.

9. A hydraulic braking assembly according to claim 7, wherein the tank has a face that faces toward the computer, and the connection means leaves from this face.

10. A hydraulic braking assembly (14) comprising an electric servomotor (15) including an electric motor (22) and a computer (19), the computer being connected to a central control member by a first cable (24) and being used to actuate the electric motor when a brake pedal is actuated by a driver, a master cylinder (16) connected to the servomotor by a support piston (23) actuated by the motor of the servomotor, a hydraulic fluid tank (17) mounted on the master cylinder, said tank communicating with a chamber of the master cylinder to feed the master cylinder with hydraulic fluid, a hydraulic fluid level sensor (25) situated in a wall of the fluid tank to monitor the hydraulic fluid level inside the tank, characterized in that the fluid level sensor is connected from the tank to the computer of the electric servomotor by a connection means (26), and wherein the computer of the servomotor has circuits for processing the signal from the sensor and transmitting processed signals to the central control member.

11. A hydraulic braking assembly according to claim 10, wherein the tank has a face that faces toward the computer, and the connection means leaves from this face.

* * * * *